(12) United States Patent
Chung et al.

(10) Patent No.: US 12,146,603 B2
(45) Date of Patent: Nov. 19, 2024

(54) ARTICULATING FAUCET WITH PROGRESSIVE MAGNETIC JOINT

(71) Applicant: Kohler Co., Kohler, WI (US)

(72) Inventors: Chanseol Chung, Shanghai (CN); Linghua Chen, Beijing (CN)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 18/353,847

(22) Filed: Jul. 17, 2023

(65) Prior Publication Data

US 2024/0052955 A1 Feb. 15, 2024

Related U.S. Application Data

(63) Continuation of application No. 17/112,939, filed on Dec. 4, 2020, now Pat. No. 11,703,156, which is a (Continued)

(30) Foreign Application Priority Data

Feb. 28, 2018 (CN) .......................... 201820281337.8

(51) Int. Cl.
*F16L 9/22* (2006.01)
*E03C 1/04* (2006.01)
(Continued)

(52) U.S. Cl.
CPC .............. *F16L 9/22* (2013.01); *E03C 1/0404* (2013.01); *F16L 27/0849* (2013.01); *F16L 37/004* (2013.01); *E03C 2001/0414* (2013.01)

(58) Field of Classification Search
CPC ....... F16L 37/004; F16L 27/0849; F16L 9/22; E03C 2001/0414
See application file for complete search history.

(56) References Cited

U.S. PATENT DOCUMENTS 1,138,187 A 5/1915 Bridges
1,255,577 A 2/1918 Berry
(Continued)

FOREIGN PATENT DOCUMENTS

CN 2777304 Y 5/2006
CN 201322115 Y 10/2009
(Continued)

OTHER PUBLICATIONS

, "Chinese Patent Application No. 201820281337.8, dated Feb. 28, 2018 (Unpublished)", 29 pages.
(Continued)

*Primary Examiner* — David Bochna
(74) *Attorney, Agent, or Firm* — Husch Blackwell LLP

(57) ABSTRACT

A faucet includes a base and a spout. The base is configured to be coupled to a mounting surface. The spout is rotatably coupled to the base. The spout includes a plurality of magnetic joints each including a different number of magnetic members, and a plurality of conduits rotatably coupled to each other by a magnetic joint of the plurality of magnetic joints. The spout extends from the base to a free end configured to discharge a fluid. The plurality of magnetic joints are arranged such that the number of magnetic members on each magnetic joint progressively increases from the free end to the base.

18 Claims, 11 Drawing Sheets

Related U.S. Application Data continuation of application No. 15/982,719, filed on May 17, 2018, now Pat. No. 10,890,277.

(51) Int. Cl.
*F16L 27/08* (2006.01)
*F16L 37/00* (2006.01)

(56) References Cited

U.S. PATENT DOCUMENTS

| | | |
|---|---|---|
| 1,276,117 A | 8/1918 | Riebe |
| 1,894,390 A | 1/1933 | Banks |
| 2,696,264 A | 12/1954 | Colmerauer et al. |
| 2,878,059 A | 3/1959 | Limle |
| 2,953,970 A | 9/1960 | Maynard |
| 3,181,895 A | 5/1965 | Cator |
| 3,674,014 A | 7/1972 | Tillander |
| 4,004,298 A | 1/1977 | Freed |
| 4,049,295 A | 9/1977 | Piers |
| 4,054,128 A | 10/1977 | Seufert et al. |
| 4,158,462 A | 6/1979 | Coral |
| 4,338,937 A | 7/1982 | Lerman |
| 4,351,323 A | 9/1982 | Ouchi et al. |
| 4,735,357 A | 4/1988 | Gregory et al. |
| 4,768,557 A | 9/1988 | Holzer |
| 4,807,370 A | 2/1989 | Trimble |
| 5,062,164 A | 11/1991 | Lee et al. |
| 5,342,018 A | 8/1994 | Wu |
| 5,667,146 A | 9/1997 | Pimentel et al. |
| 5,755,262 A | 5/1998 | Pilolla |
| 5,865,378 A | 2/1999 | Hollinshead et al. |
| 5,868,311 A | 2/1999 | Cretu-Petra |
| 5,979,487 A | 11/1999 | Devehat |
| 6,164,570 A | 12/2000 | Smeltzer |
| 6,626,210 B2 | 9/2003 | Luettgen et al. |
| 6,648,376 B2 | 11/2003 | Christianson |
| 6,715,491 B2 | 4/2004 | Cooper et al. |
| 6,854,768 B2 | 2/2005 | Elder |
| 7,019,433 B2 | 3/2006 | Hashimoto et al. |
| 7,326,350 B2 | 2/2008 | Mueller et al. |
| 7,383,611 B2 | 6/2008 | Foster |
| 7,637,905 B2 | 12/2009 | Saadat et al. |
| 7,669,899 B2 | 3/2010 | Carson |
| 7,793,987 B1 | 9/2010 | Busch et al. |
| 8,024,822 B2 | 9/2011 | Macan et al. |
| 8,191,580 B2 | 6/2012 | Scott |
| 8,210,572 B2 | 7/2012 | Davis |
| 8,376,865 B2 | 2/2013 | Forster et al. |
| 8,413,686 B2 | 4/2013 | Ko |
| 8,608,502 B2 | 12/2013 | Witter et al. |
| 9,093,206 B2 | 7/2015 | Davis |
| 9,198,561 B2 | 12/2015 | Smith et al. |
| 9,272,171 B2 | 3/2016 | Kolacz et al. |
| 9,315,975 B2 | 4/2016 | Davidson et al. |
| 9,377,156 B2 | 6/2016 | Wong |
| 9,649,881 B2 | 5/2017 | Warncke et al. |
| 9,803,787 B2 | 10/2017 | Scott et al. |
| 9,849,551 B2 | 12/2017 | Ebihara et al. |
| 10,492,552 B2 | 12/2019 | Jaeger et al. |
| 10,890,277 B2 | 1/2021 | Chung et al. |
| 11,703,156 B2 * | 7/2023 | Chung ............... F16L 27/0849 138/155 |
| 2004/0154673 A1 | 8/2004 | Mascari et al. |
| 2005/0103903 A1 | 5/2005 | Shamir et al. |
| 2005/0133545 A1 | 6/2005 | Find |
| 2005/0283904 A1 | 12/2005 | Macan et al. |
| 2006/0192161 A1 | 8/2006 | Kuna et al. |
| 2007/0044232 A1 | 3/2007 | McNerney et al. |
| 2008/0187393 A1 | 8/2008 | Nellessen |
| 2009/0293238 A1 | 12/2009 | Davis |
| 2010/0307497 A1 | 12/2010 | Busch et al. |
| 2011/0012343 A1 | 1/2011 | Gutierrez-Lemini et al. |
| 2011/0038064 A1 | 2/2011 | Xhunga |
| 2011/0162743 A1 | 7/2011 | Nelson |
| 2012/0024412 A1 | 2/2012 | Bertelo et al. |
| 2012/0319313 A1 | 12/2012 | Davis |
| 2013/0276923 A1 | 10/2013 | Wolff et al. |
| 2013/0285365 A1 | 10/2013 | Davis |
| 2014/0166124 A1 | 6/2014 | Davidson et al. |
| 2014/0235361 A1 | 8/2014 | Forster et al. |
| 2014/0318650 A1 | 10/2014 | Wolff et al. |
| 2015/0308087 A1 | 10/2015 | Zhu et al. |
| 2016/0109046 A1 | 4/2016 | Lee et al. |
| 2016/0208580 A1 | 7/2016 | Delzell et al. |
| 2016/0215482 A1 | 7/2016 | Fourman et al. |
| 2017/0074441 A1 | 3/2017 | Erickson et al. |
| 2019/0037322 A1 | 1/2019 | Santek et al. |
| 2019/0264838 A1 | 8/2019 | Chung et al. |
| 2019/0264848 A1 | 8/2019 | Chung |
| 2019/0264849 A1 | 8/2019 | Chung |
| 2019/0368172 A1 | 12/2019 | Chung |
| 2019/0372322 A1 | 12/2019 | Tseng |

FOREIGN PATENT DOCUMENTS

| | | |
|---|---|---|
| CN | 102007330 A | 4/2011 |
| CN | 203453524 U | 2/2014 |
| CN | 204628724 U | 9/2015 |
| CN | 105822791 A | 8/2016 |
| EP | 2378011 A1 | 10/2011 |
| EP | 2896759 A1 | 7/2015 |
| EP | 3043000 A1 | 7/2016 |
| GB | 983278 A | 2/1965 |
| GB | 2431085 A | 4/2007 |
| KR | 20110136087 A | 12/2011 |
| WO | 2012075593 A1 | 6/2012 |
| WO | 2013093521 A1 | 6/2013 |
| WO | 2015010251 A1 | 1/2015 |

OTHER PUBLICATIONS

, "Extended European Search Report received for EP Patent Application No. 19159567.7, dated Jun. 27, 2019", 9 pages.
, "Extended European Search Report received for EP Patent Application No. 19159570.1, dated Jul. 1, 2019", 9 pages.
, "Extended European Search Report received for EP Patent Application No. 19159584.2, dated Jul. 15, 2019", 8 pages.
, "First Office Action received for Chinese Patent Application No. 201910152115.5, dated May 22, 2020", 10 pages.
, "First Office Action received for Chinese Patent Application No. 201910153128.4, dated May 22, 2020", 11 pages.
, "First Office Action received for Chinese Patent Application No. 201910476155.5, dated Jul. 15, 2020", 15 pages.
, "First Office Action received for Chinese Patent Application No. 201910476937.9, dated Dec. 1, 2020", 12 pages.
, "Second Office Action received for Chinese Patent Application No. 201910152115.5, dated Jan. 1, 2021", 4 pages.
, "Second Office Action received for Chinese Patent Application No. 201910476155.5, dated Mar. 9, 2021", 13 pages.
, "Third Office Action received for Chinese Patent Application No. 201910152115.5, dated Jul. 8, 2021", 10 pages.

* cited by examiner

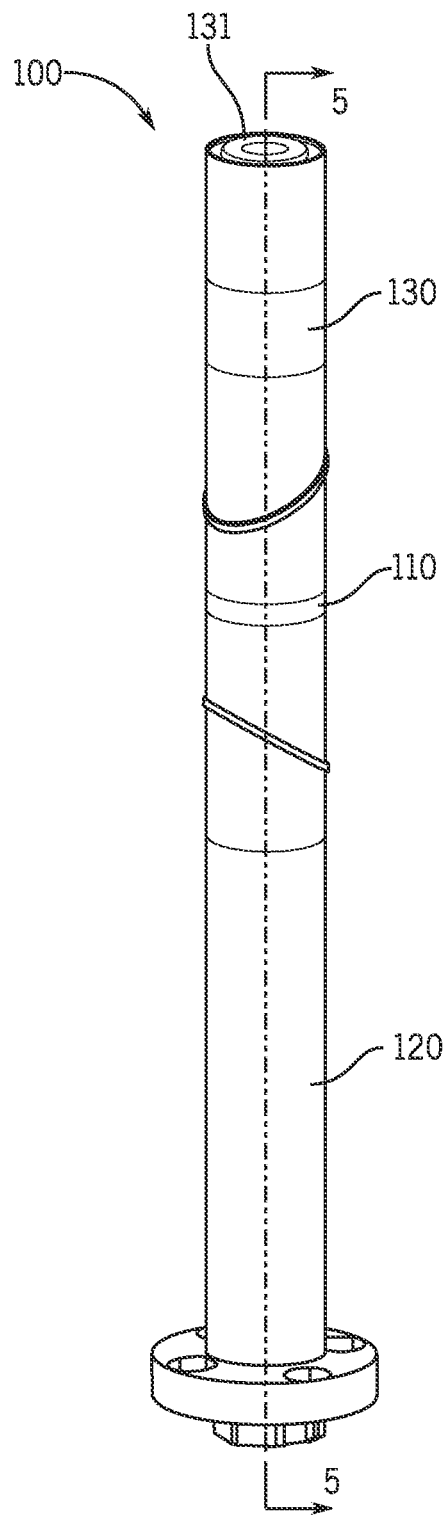
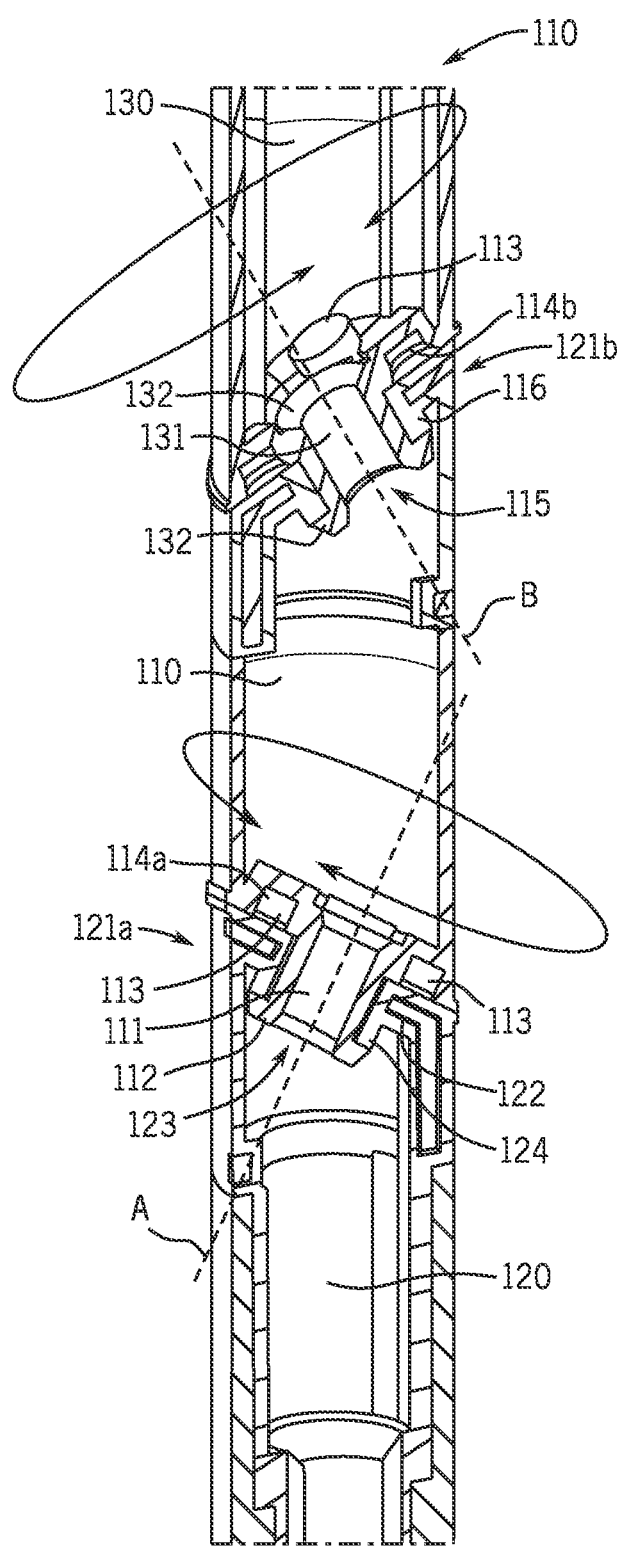
FIG. 4
FIG. 5

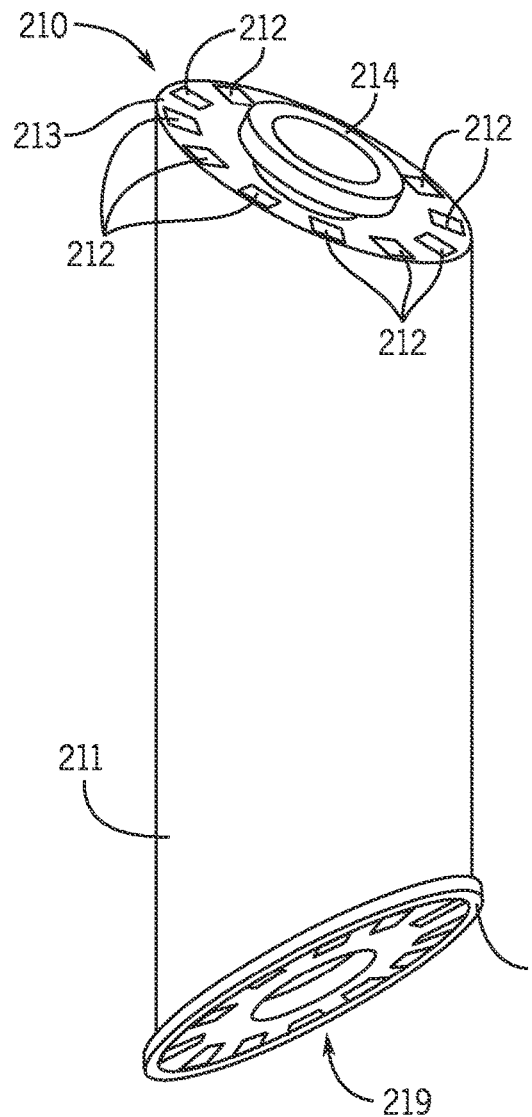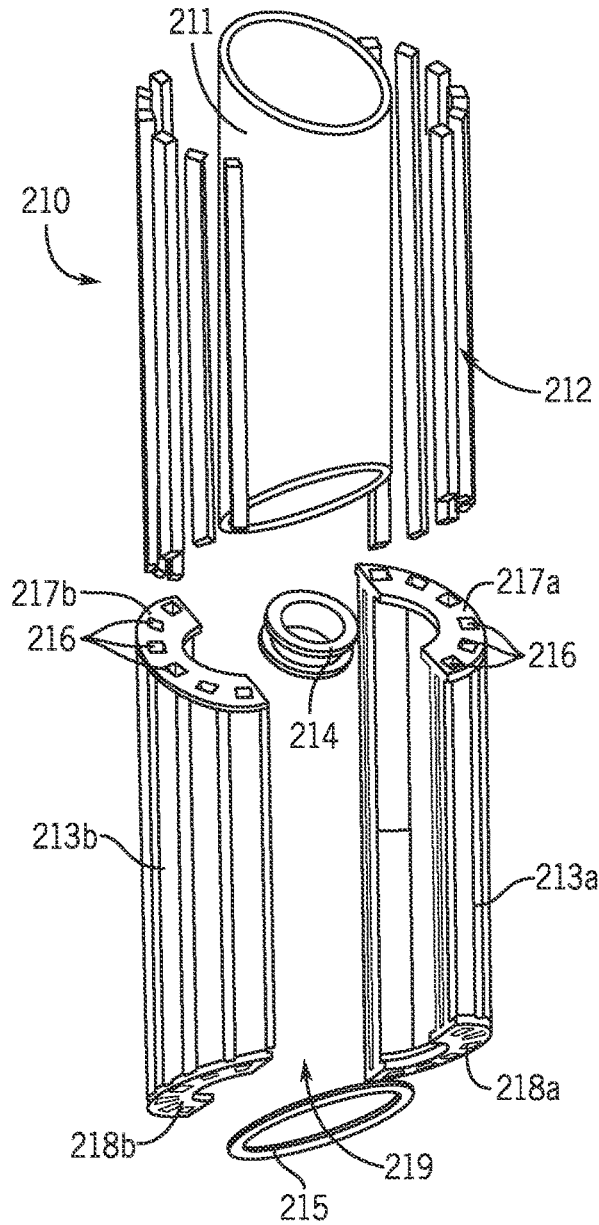
FIG. 6
FIG. 7

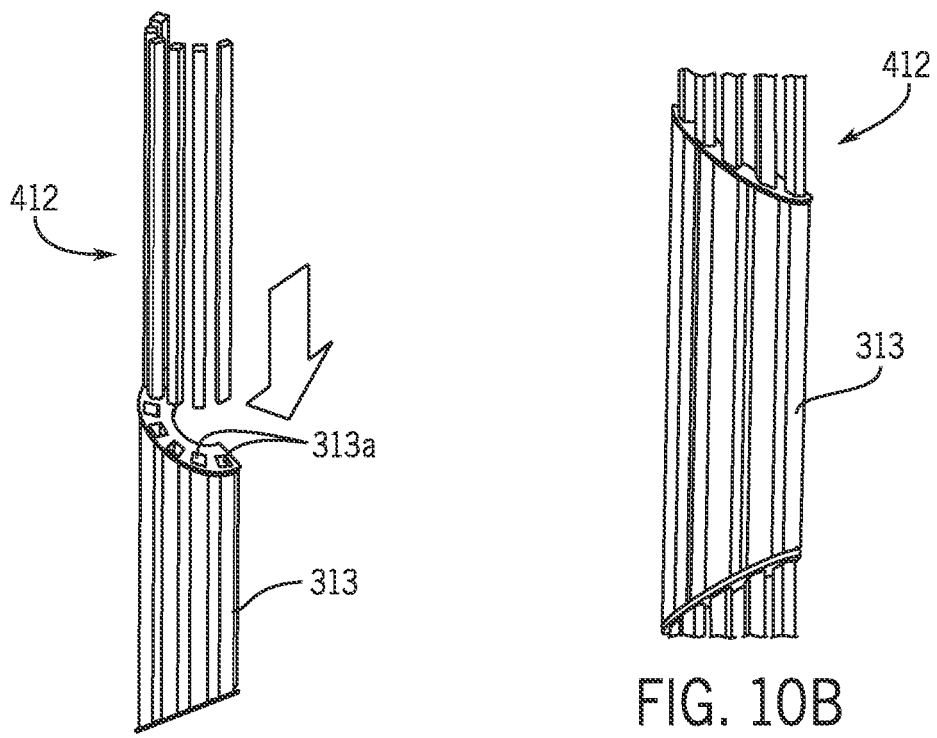
FIG. 10A
FIG. 10B
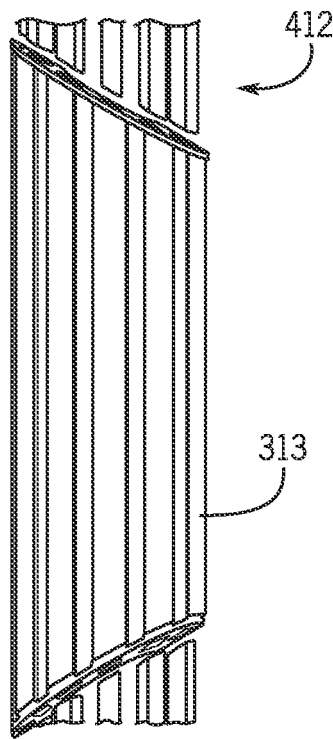
FIG. 10C

ARTICULATING FAUCET WITH PROGRESSIVE MAGNETIC JOINT

CROSS-REFERENCE TO RELATED APPLICATIONS

This application is a continuation of U.S. patent application Ser. No. 17/112,939, now U.S. Pat. No. 11,703,156, filed Dec. 4, 2020, which is a continuation of U.S. patent application Ser. No. 15/982,719, now U.S. Pat. No. 10,890,277, filed May 17, 2018, which claims the benefit of and priority to Chinese Utility Model Application No. 2018202813378, filed Feb. 28, 2018. The entire disclosures of the foregoing applications are hereby incorporated by reference herein.

BACKGROUND

The present application relates generally to water delivery devices, such as faucets and the like.

Water delivery devices, such as faucets, can include a rigid spout or conduit for directing fluid to a user. Generally speaking, most rigid faucet spouts have a fixed structural shape or orientation, and are not adjustable so as to change the orientation or aesthetic appearance of the spout.

SUMMARY

One embodiment of the present application relates to a water delivery device. The water delivery device includes a plurality of magnetic joints each including a plurality of magnetic members, and a plurality of conduit sections each rotatably coupled to each other by a magnetic joint of the plurality of magnetic joints. The plurality of conduit sections collectively define a spout of the water delivery device. The spout extends from a first portion configured to be coupled to a mounting surface to a second portion configured to discharge a fluid. The water delivery device is configured such that magnetic joints located closer to the first portion include a greater number of magnetic members than magnetic joints located closer to the second portion.

Another embodiment relates to a water delivery device. The water delivery device includes a plurality of magnetic joints each including a plurality of magnets, and a plurality of conduit sections each rotatably coupled to each other by a magnetic joint of the plurality of magnetic joints. The plurality of conduit sections collectively define a spout of the water delivery device. The spout extends from a first portion configured to be coupled to a mounting surface to a second portion configured to discharge a fluid. Each of the plurality of conduit sections is configured to be rotated relative to an adjacent conduit section between a plurality of rotational positions defined by each of the plurality of magnetic joints. The water delivery device is configured such that magnetic joints located closer to the first portion include a greater number of magnets than magnetic joints located closer to the second portion.

Another embodiment relates to a water delivery device. The water delivery device includes a first conduit section configured to be coupled to a mounting surface, a second conduit section rotatably coupled to the first conduit section by a first magnetic joint, and a third conduit section rotatably coupled to the second conduit section by a second magnetic joint. The second and third conduit sections are configured to be rotated relative to each other and relative to the first conduit section between a plurality of rotational positions defined by the first and second magnetic joints. The first magnetic joint includes a greater number of magnets than the second magnetic joint.

In some exemplary embodiments, each of the plurality of magnetic joints comprises a first member configured to be coupled an end portion of a conduit section, and a second member rotatably coupled to the first member and configured to be coupled to an end portion of an adjacent conduit section. The first member includes a first plurality of magnetic members spaced apart from each other and arranged annularly on the first member, and the second member includes a second plurality of magnetic members spaced apart from each other and arranged annularly on the second member.

In some exemplary embodiments, the first plurality of magnetic members are spaced equidistant relative to each other, and the second plurality of magnetic members are spaced equidistant relative to each other.

In some exemplary embodiments, the first member is configured to bias away from the second member when the first plurality of magnetic members substantially overlap the second plurality of magnetic members.

In some exemplary embodiments, the first member is configured to bias toward the second member when the first plurality of magnetic members substantially overlap the spaces between the second plurality of magnetic members.

In some exemplary embodiments, each of the conduit sections is substantially rigid.

In some exemplary embodiments, each of the conduit sections has an angled interface between adjacent conduit sections.

In some exemplary embodiments, one or more of the conduit sections includes an elbow portion.

In some exemplary embodiments, the water delivery device further comprises a fluid conduit extending through one or more of the plurality of conduit sections. The fluid conduit is configured to direct fluid from a fluid supply source to the second portion of the spout.

In some exemplary embodiments, the first magnetic joint comprises a first member coupled to an end portion of the first conduit section, and a second member rotatably coupled to the first member and coupled to an end portion of the second conduit section. The first member includes a first plurality of magnets spaced apart from each other and arranged annularly on the first member, and the second member includes a second plurality of magnets spaced apart from each other and arranged annularly on the second member.

In some exemplary embodiments, the second magnetic joint comprises a third member coupled to an end portion of the second conduit section, and a fourth member rotatably coupled to the third member and coupled to an end portion of the third conduit section. The third member includes a third plurality of magnets spaced apart from each other and arranged annularly on the third member, and the fourth member includes a fourth plurality of magnets spaced apart from each other and arranged annularly on the fourth member. The fourth plurality of magnets is less than the third plurality of magnets. The third plurality of magnets is equal to the first plurality of magnets.

BRIEF DESCRIPTION OF THE DRAWINGS

FIG. 4 is a perspective view of a faucet according to an exemplary embodiment.

FIG. 5 is a cross-sectional view of the faucet of FIG. 4.

FIG. 6 is a perspective view of a conduit section for use in a fluid delivery device according to an exemplary embodiment.

FIG. 7 is an exploded view of the conduit section of FIG. 6.

FIGS. 10A-10C illustrate a method of assembling magnetic members into a conduit section according to another exemplary embodiment.

DETAILED DESCRIPTION

Referring generally to the FIGURES, disclosed herein are water delivery devices that each include a plurality of movable or articulating conduit sections to allow for reconfiguring or reorienting the shape of the device. According to various exemplary embodiments, the water delivery devices include a spout or conduit defined by a plurality of rigid conduit sections, where adjacent conduit sections are magnetically coupled to each other by a magnetic joint. The magnetic joint includes a first member including a first plurality of individual magnetic members spaced apart from each other and arranged annularly on the first member (e.g., a first magnet array, etc.). The magnetic joint further includes a second member including a second plurality of individual magnetic members similarly spaced apart from each other and arranged annularly on the second member (e.g., a second magnet array, etc.). The first member can be coupled to or integrally formed with an end of a first conduit section, and the second member can be coupled to or integrally formed with an end of an adjacent conduit section (e.g., a second conduit section, a third conduit section, etc.). Each of the conduit sections can be selectively rotated relative to adjacent conduit sections between a plurality of rotational positions defined by the spacing and the polarity of the magnetic members at the magnetic joint, so as to selectively reorient the conduit section(s) and change the overall shape of the water delivery device. This can, advantageously, allow for increased functionality of the water delivery device to, for example, fill various containers, provide access for cleaning various kitchen accessories (e.g., pots, pans, etc.), provide clearance around other structures or appliances where the water delivery device is installed, or change the overall aesthetic appearance of the water delivery device.

According to an exemplary embodiment, the magnetic members on one of the conduit sections can be arranged to have an opposite polarity to the magnetic members on an adjacent conduit section, such that the two conduit sections can be magnetically coupled to, or biased toward, each other by an attractive magnetic force when the magnetic members on the two conduit sections are facing or substantially overlapping each other. According to another exemplary embodiment, the magnetic members can be arranged to have the same polarity when facing or substantially overlapping each other, such that the magnetic members repel, or bias away, from each other when rotated directly above an opposite magnet, but can attract, or bias toward, each other when rotated to substantially overlap the spaces between the magnetic members (see, for example, FIG. 11).

Figure 16:
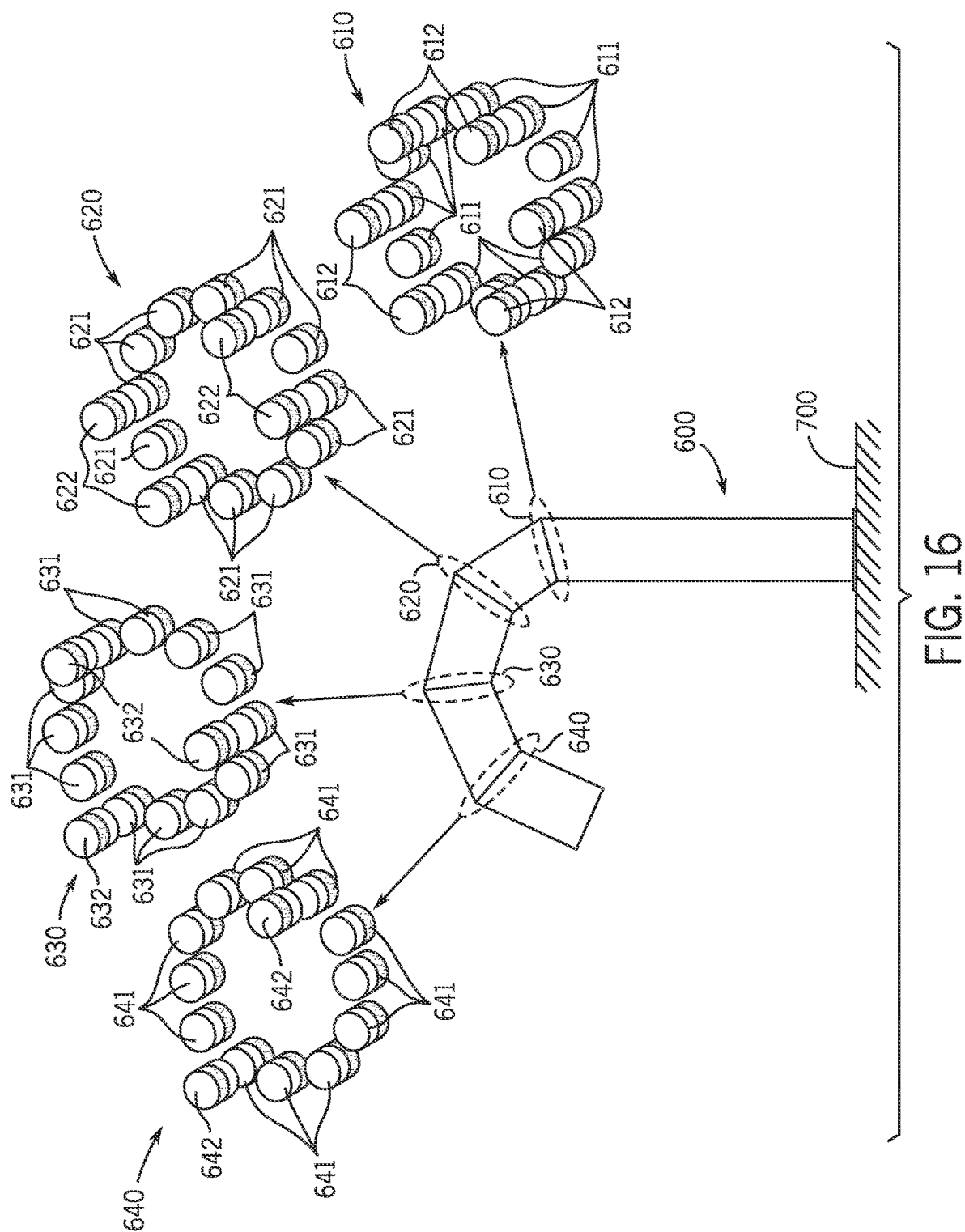
FIG. 16 is a schematic illustration of a water delivery device including a plurality of conduit sections having a progressive arrangement of magnetic members according to an exemplary embodiment.

According to another exemplary embodiment, one of the conduit sections can include a plurality of magnetic members arranged with alternating polarities, such that the magnetic members on the adjacent conduit section are attracted to the magnetic members having opposite polarity on the other conduit section (i.e., biased toward each other), to thereby set a relative rotational position of the conduit sections (see, for example, FIG. 16). The magnetic members having the same polarity can repel each other (i.e., bias away from each other) during rotation of one of the conduit sections to set a different rotational position of the conduit section(s). According to various exemplary embodiments, the adjacent conduit sections do not contact each other at the magnetic members (e.g., during rotation of the conduit sections, etc.), so as to minimize the amount of friction at the joint. In this way, rotation of the two conduit sections relative to each other provides a particular tactile response and requires minimal effort or force by a user and/or by an actuator (e.g., an electromagnetic actuator, an electric motor, etc.).

Figure 1:
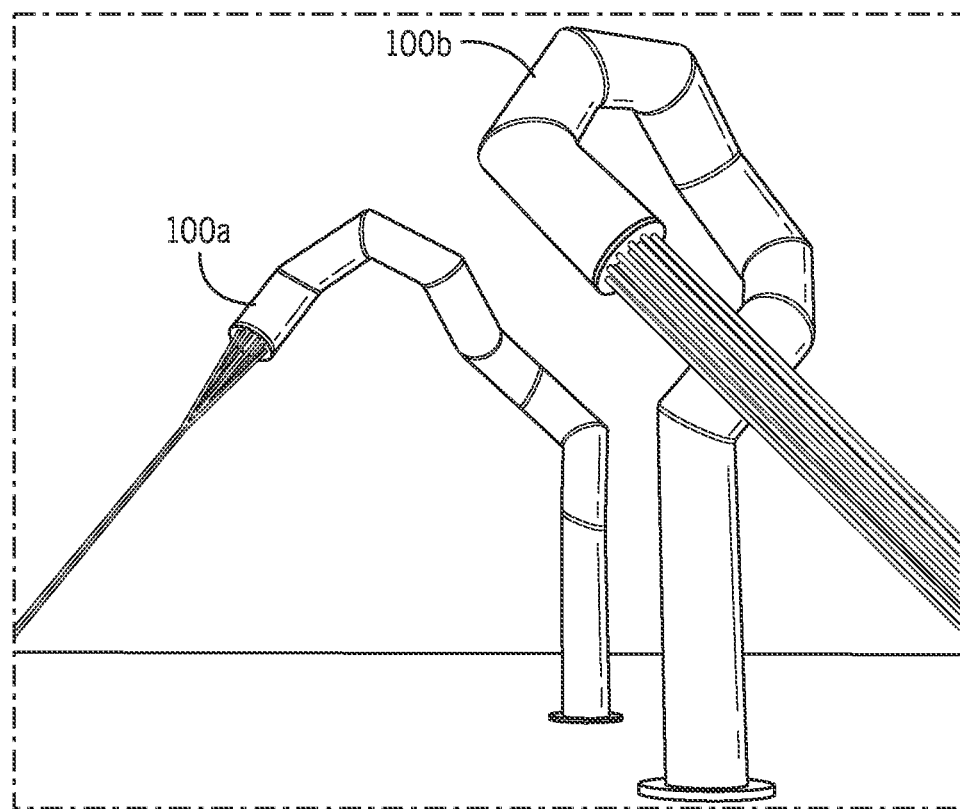
FIG. 1 is a perspective view of a faucet shown in two different orientations according to an exemplary embodiment.
Figure 2:
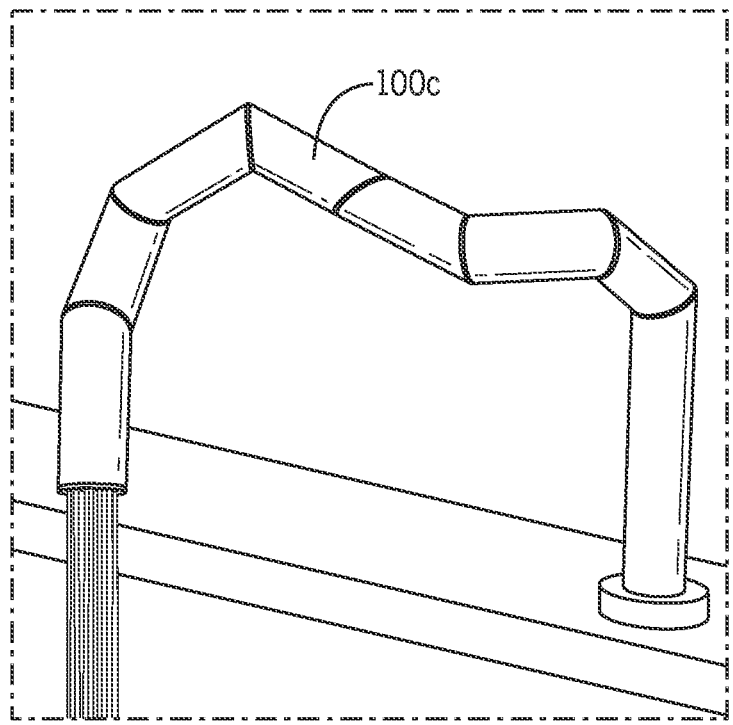
FIG. 2 is a perspective view of the faucet of FIG. 1 shown in another orientation according to another exemplary embodiment.
Figure 3:
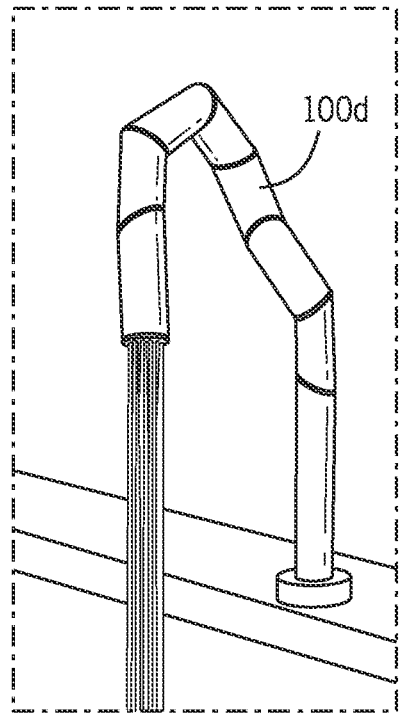
FIG. 3 is a perspective view of the faucet of FIG. 2 shown in another orientation according to another exemplary embodiment.

Referring to FIGS. 1-3, a water delivery device, shown as a faucet 100, is illustrated in various orientations 100a, 100b, 100c, and 100d, according to various exemplary embodiments. FIG. 1 illustrates a faucet 100 shown in a first orientation 100a. The faucet 100a includes a base 110a and a spout 120a defined by a plurality of conduit sections 121a rotatably coupled to each other. According to an exemplary embodiment, the plurality of conduit sections 121a are substantially rigid. Each of the plurality of conduit sections 121a can be selectively (e.g., manually or automatically) moved by rotating one or more of the conduit sections relative to the base 110a or relative to an adjacent conduit section 121a, so as to change the orientation or shape of the spout. According to the exemplary embodiment shown in FIG. 1, the faucet 100 can be reconfigured or reoriented to a second orientation 100b. Similarly, the faucet 100 can be reconfigured to a third orientation 100c, shown in FIG. 2, or to a fourth orientation 100d, shown in FIG. 3. Although only four different orientations are illustrated in FIGS. 1-3, it is appreciated that the faucet 100 can be reconfigured to a plurality of other orientations not shown.

As shown in FIGS. 1-3, each of the conduit sections 121a has a tapered or angled interface (e.g., joint, end, etc.) where the adjacent conduit sections meet, such that rotating the conduit sections 121a relative to each other, or relative to the base 110, can change the orientation or overall shape of the spout 120a. For example, with angled interfaces, each conduit section may define a longitudinal axis along its length, and rotating adjacent conduit sections results in changing the relative angular orientations of the longitudinal axes of the adjacent conduit sections. According to an exemplary embodiment, the conduit sections 121a have an oval cross-sectional shape, such that the angled or tapered end at the joint interface has a circular cross-sectional shape. This can, advantageously, allow for a circular arrangement of magnetic members at the joint interface to provide for uniform spacing between the individual magnetic members of each magnetic joint.

Referring to FIGS. 4-5, a faucet 100 is shown according to another exemplary embodiment. The faucet 100 includes a base 120, a first conduit section 110, and a second conduit section 130. According to an exemplary embodiment, the base 120 is configured to be coupled to a mounting surface, such as a countertop or the like. The first conduit section 110 and the second conduit section 130 are configured to be rotated relative to each other and relative to the base 120, so as to selectively reconfigure the shape of the faucet 100. As shown in FIG. 5, the base 120 includes a hollow interior defining a flow channel for fluid to flow through. The base 120 includes part of a first magnetic joint 121a including a first magnet array 122 having a plurality of magnetic members 113. The base 120 further includes an opening 123 defined by a wall 124. The base 120 is configured to be fixed relative to the first conduit section 110 and the second conduit section 130.

The first conduit section 110 is rotatably coupled to the base 120 at the first magnetic joint 121a via a protrusion 111. As shown in FIG. 5, the protrusion 111 is received in the opening 123, and is rotatably coupled to the wall 124 via a flange 112. The first conduit section 110 is configured to rotate relative to the base 120 via the protrusion 111 about an axis "A" defined by the opening 123. The protrusion 111 includes a hollow interior to allow for a flow of water to pass through from the base 120 to an interior of the first conduit section 110. In other words, the protrusion 111 fluidly couples the base 120 to the first conduit section 110. The first conduit section 110 further includes a second magnet array 114 having a plurality of magnetic members 113. The second magnet array 114 is positioned on a plane parallel to the first magnet array 122. The first magnet array 114 and the second magnet array 122 cooperatively define the first magnetic joint 121a of the assembly.

Still referring to FIG. 5, the second conduit section 130 is rotatably coupled to the first conduit section 110 at an end opposite to the first magnetic joint 121a at a second magnetic joint 121b via a protrusion 131. The protrusion 131 is received in an opening 115 defined by a wall 116 of the first conduit section 110. The protrusion 131 is rotatably coupled to the wall 116 via a flange 132. The first conduit section 110 is configured to rotate relative to the second conduit section 130, and vice versa, via the protrusion 131 about an axis "B" defined by the opening 115. The axis B is oriented at an angle that is different than the orientation of axis A (e.g., 90 degrees relative to each other, etc.), such that rotation of the first conduit section 110 and/or of the second conduit section 130 relative to each other, or relative to the base 120, results in a change of orientation of the entire assembly. The protrusion 131 includes a hollow interior to allow for a flow of water to pass through from the first conduit section 110 to an interior of the second conduit section 130, and to an outlet 131 located at a distal end of the second conduit § 130. The second magnetic joint 121b includes a third magnet array 114b having a plurality of magnetic members 113. The third magnet array 114b is positioned on a plane parallel to a fourth magnet array 132 located at an end of the second conduit section 130. The third magnet array 114b and the fourth magnet array 132 cooperatively define the second magnetic joint 121b of the assembly.

According to an exemplary embodiment, the various magnet arrays of the first and second magnetic joints 121a, 121b have the same number of magnetic members and can be spaced apart the same distance on each array. According to an exemplary embodiment, the first magnetic joint 121a and the second magnetic joint 121b can include at least eight magnetic members. According to other exemplary embodiments, the number of, and spacing of, the magnetic members on each of the magnetic joints is different (see, for example, FIG. 16). According to various exemplary embodiments, the spacing and the polarity of the magnetic members can be arranged to define a plurality of rotational positions for setting a relative rotational position of the various conduit sections (e.g., conduit sections 110, 130, etc.).

Figure 11:
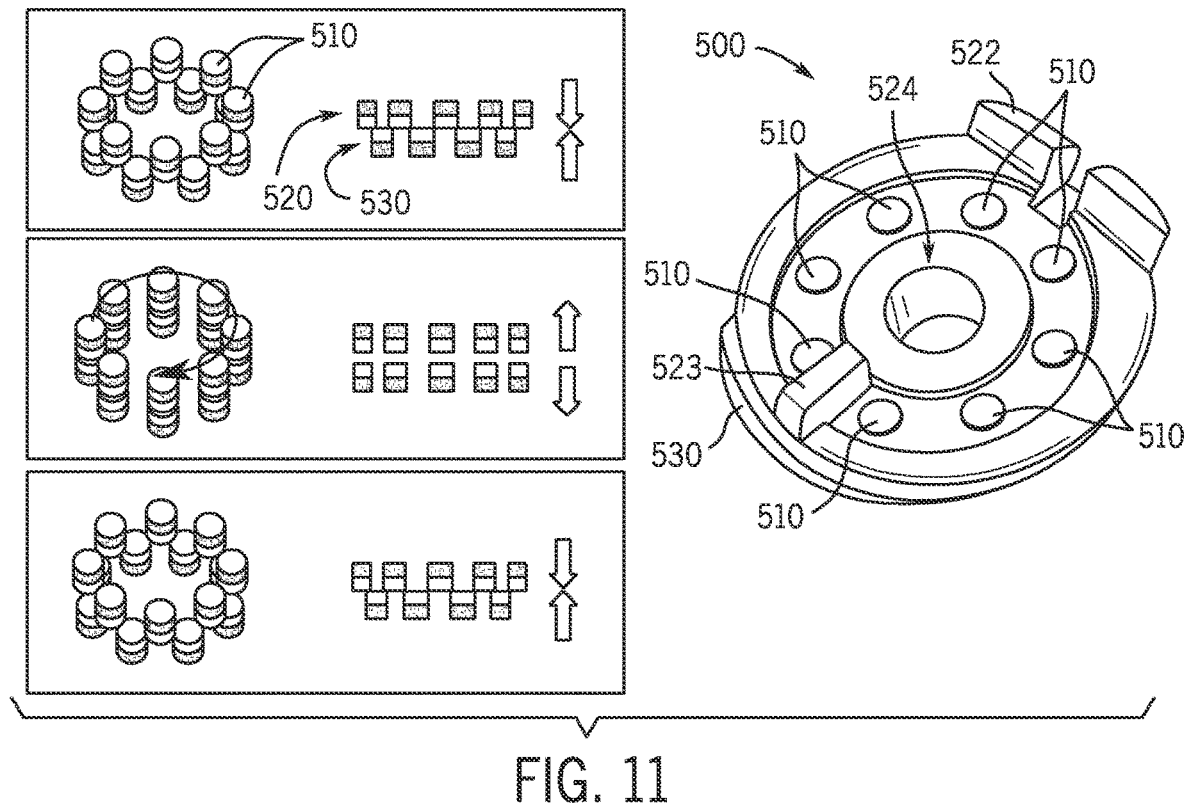
FIG. 11 illustrates the polarity and interaction of the magnetic members of a magnetic joint for use in a conduit section according to an exemplary embodiment.
Figure 12:
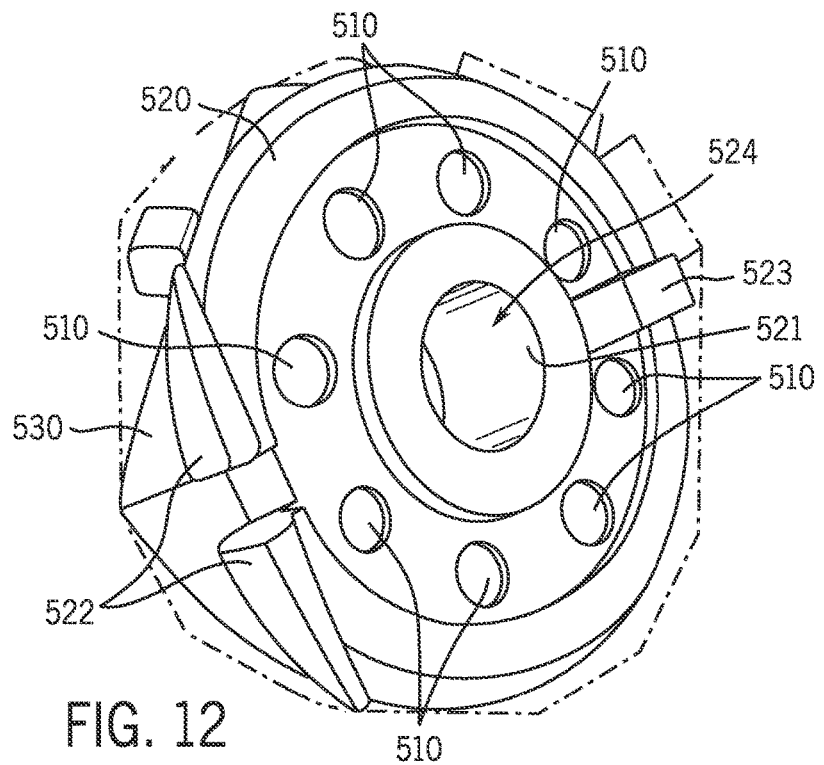
FIGS. 12-15 are perspective views of a magnetic joint according to an exemplary embodiment.
Figure 13:
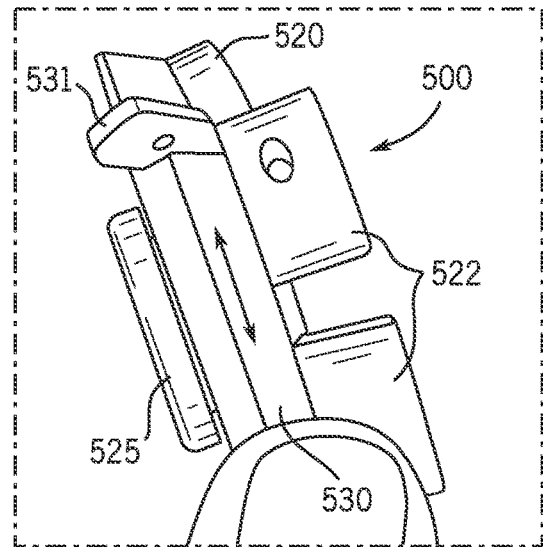
Figure 14:
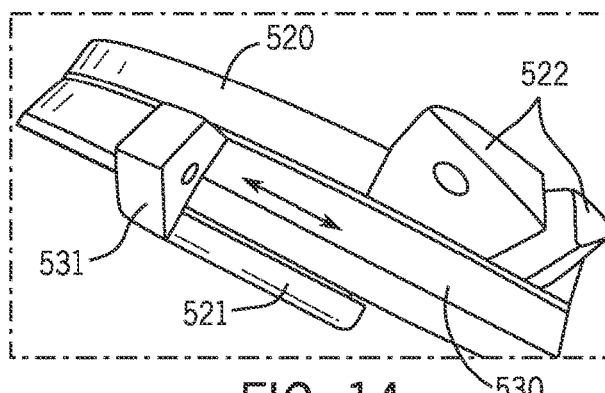
Figure 15:
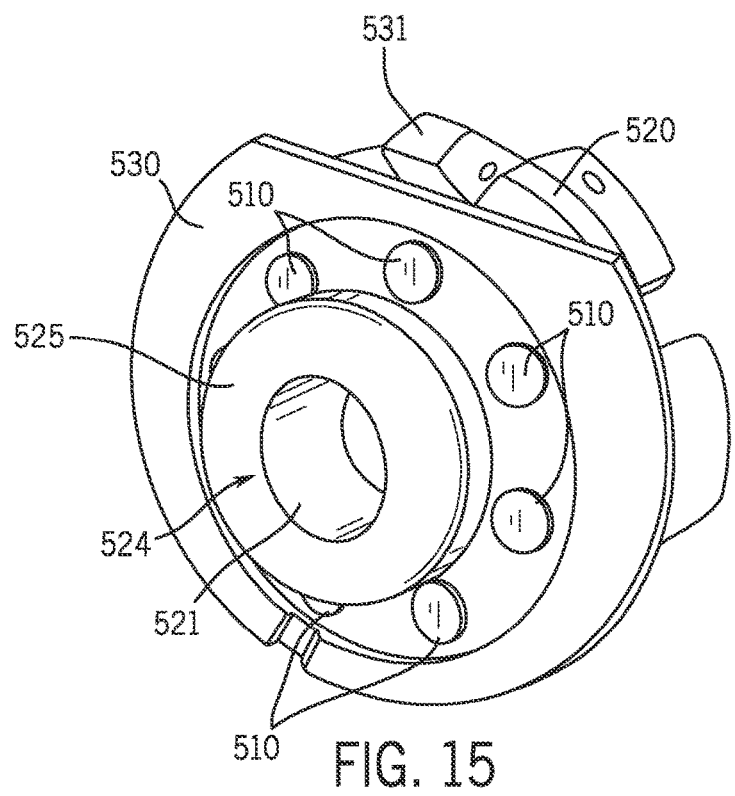

For example, referring to FIG. 11, the magnetic members 113 of the various magnet arrays described above can be configured or arranged as the magnetic members 510 shown in FIG. 11. As shown in FIG. 11, the magnetic members 510 each have a north-south polarity. A first member 520 includes a first plurality of magnetic members 510 that are arranged to have their south polarity facing toward the south polarity of a second plurality of magnetic members 510 located on a second member 530. The first member 520 and the second member 530 can cooperatively define a magnetic joint. In this way, when the second member 530 is rotated relative to the first member 520, the magnetic members 510 will repel each other (i.e., bias away from each other) when directly facing or substantially overlapping each other on the two members, such as during rotation of the two members relative to each other, but will attract each other (i.e., bias toward each other) at the spaces between the magnetic members due to the opposite north-south polarities in these regions. Thus, the spaces between the plurality of magnetic members 510 on each member define a plurality of angular positions to hold or set the two members relative to each other.

In this manner, the magnetic joints 121a, 121b can allow for the selective repositioning of the first conduit section 110 and/or the second conduit section 130 relative to each other, or relative to the base 120, so as to reconfigure the shape of the faucet 100. This can, advantageously, allow for the faucet 100 to fill various containers, provide access for cleaning various kitchen accessories (e.g., pots, pans, etc.), provide clearance around other structures or appliances where the faucet is installed, or change the overall aesthetic appearance of the faucet.

Referring to FIGS. 6-7, a conduit section 210 is shown according to another exemplary embodiment. In this embodiment, the conduit section 210 includes an outer sleeve 211, a first body half 213a, a second body half 213b, a plurality of magnetic members 212, a bushing 214, and a seal 215. The first body half 213a and the second body half 213b each include a plurality of openings or sleeves 216 for receiving a plurality of magnetic members 212 therein. As shown in the embodiment of FIG. 7, the first and second body halves 213a and 213b each include six sleeves 216 arranged annularly about a center axis of each body half According to other exemplary embodiments, the body halves 213a, 213b can include a different number of sleeves for receiving a different number of magnetic members 212. Each of the sleeves 216 is spaced equidistant relative to each other along the circumference of each body, according to an exemplary embodiment, although other alternative spacing is contemplated. The first body half 213a and the second body half 213b each have a generally half-cylinder shape. The first body half 213a is configured to be coupled to the second body half 213b (e.g., via adhesive, ultrasonic welding, etc.) to define a single, unitary body 213 including a central opening 219 (see FIG. 6). The two body halves 213a, 213b are configured to be coupled to each other with the bushing 214 disposed therebetween at an upper and/or lower portion thereof. At least a portion of the bushing 214 is disposed above an end of the body 213, and is configured to rotatably couple two conduit sections together (see, for example, FIGS. 8A-8C). In addition, the bushing 214 includes a central opening to fluidly couple two conduit sections together (i.e., to allow a flow of fluid to pass between two adjacent conduit sections).

Still referring to FIGS. 6-7, the first body half 213a includes an upper end surface 217a and a lower end surface 218a. The upper end surface 217a and the lower end surface 218a are each oriented at different angles relative to each other (e.g., 90 degrees, etc.). In other words, the upper end surface 217a and the lower end surface 218a are not parallel to each other. Likewise, the second body half 213b includes an upper end surface 217b and a lower end surface 218b. The upper end surface 217b is oriented at the same angle as the upper end surface 217a of the first body half 213a, and the lower end surface 217b is oriented at the same angle as the lower end surface 217a, to thereby define upper and lower coplanar surfaces of the unitary body 213 (e.g., when the first and second body halves 213a, 213b are coupled together). In this way, rotation of the conduit section 210 relative to another adjacent conduit section 210, or relative to a fixed base (e.g., base 120, etc.), will change the orientation or overall shape of the assembly. According to an exemplary embodiment, the conduit section 210 has an oval cross-sectional shape, such that the angled end surfaces have a circular cross-sectional shape. This can, advantageously, allow for a circular arrangement of magnetic members 212 at the end surfaces to provide for uniform spacing between the individual magnetic members.

As shown in the embodiment of FIGS. 6-7, each of the magnetic members 212 is disposed in a sleeve 216 of the body 213. At least a portion of each of the magnetic members 212 is exposed at the upper end surface 217 and at the lower end surface 218. According to an exemplary embodiment, each of the magnetic members 212 is substantially flush with the upper end surface 217 and the lower end surface 218 of the body 213. In this way, the upper end surface 217 and the lower end surface 218 can define part of an upper magnetic joint and a lower magnetic joint of the conduit 210, respectively. The upper magnetic joint and the lower magnetic joint can, advantageously, allow for a plurality of conduit sections 210 to be rotatably coupled together.

Figure 8A:
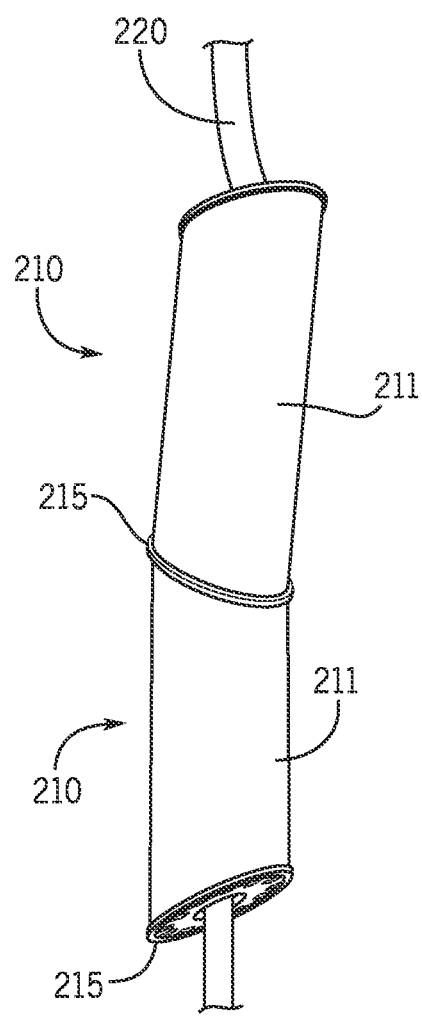
FIG. 8A is a perspective view of two conduit sections including a central conduit, according to an exemplary embodiment.
Figure 8B:
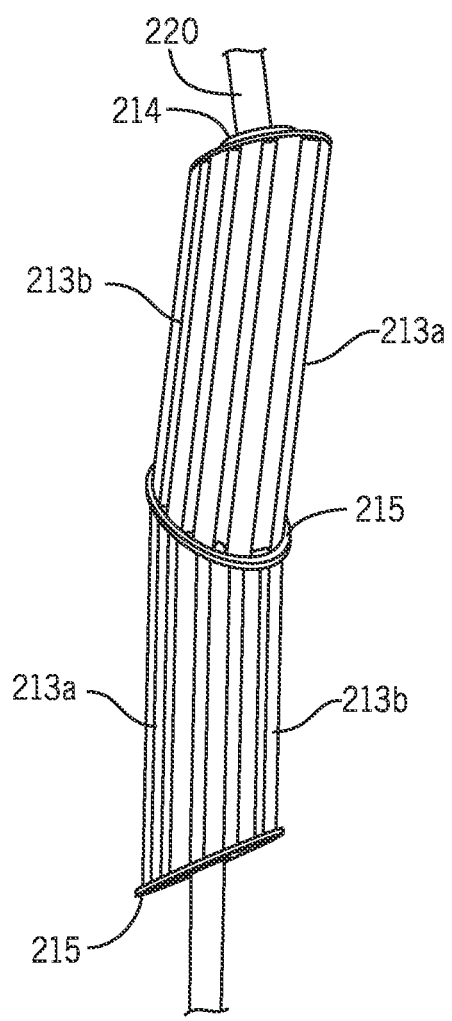
FIG. 8B is a perspective view of the two conduit sections of FIG. 8A shown with the outer cover removed.
Figure 8C:
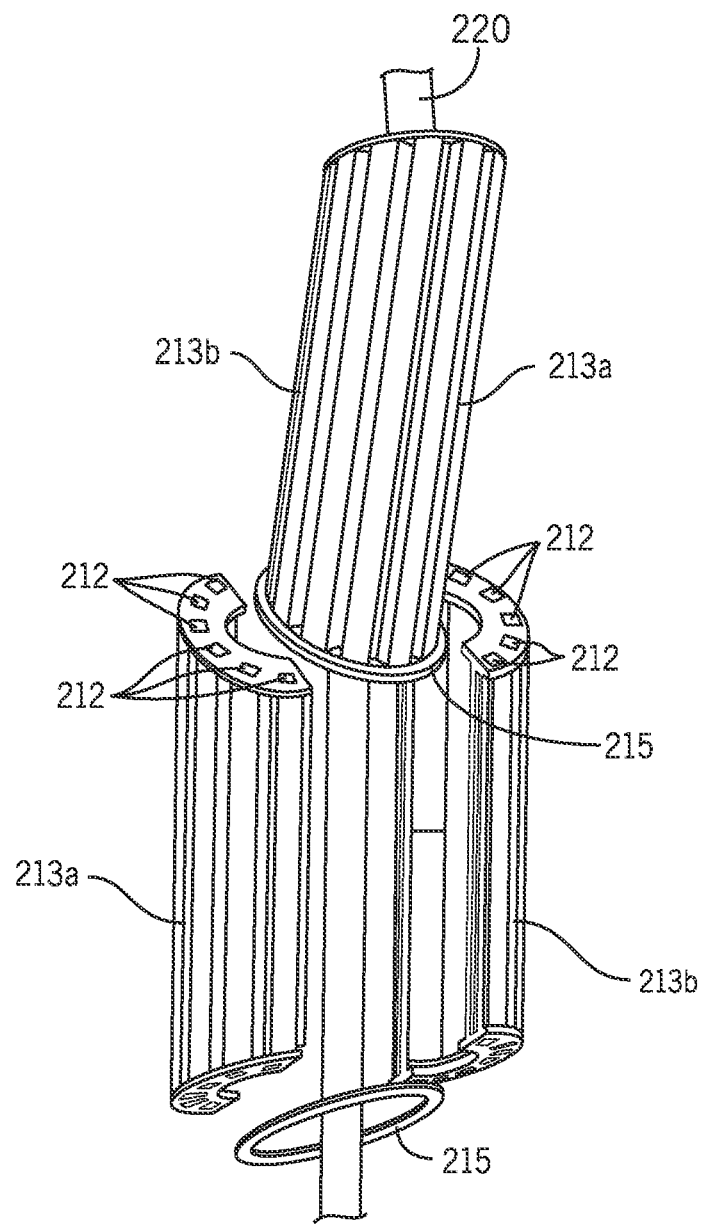
FIG. 8C is a partial exploded view of the two conduit sections of FIG. 8B.

For example, as shown in FIGS. 8A-8C, at least two conduit sections 210 are rotatably coupled to each other to define, for example, part of a faucet assembly or a similar water delivery device. A fluid conduit 220 (e.g., tube, etc.) is disposed through the central opening 219 of each conduit section 210 to allow for a flow of fluid to pass therethrough. The seal 215, shown as an O-ring according to an exemplary embodiment, can sealingly engage two conduit sections 210 at an interface of the two conduit sections 210. As shown in FIGS. 8A-8C, the two conduit sections 210 are rotatably coupled to each other via the bushing 214, and can be selectively rotated between a plurality of angular positions defined by a magnetic joint of the assembly. The magnetic joint is cooperatively defined by a lower end surface 217 of the upper conduit section 210 and an upper end surface of the lower conduit section 210. According to various exemplary embodiments, the spacing and the polarity of the magnetic members 212 at the upper and lower end surfaces of the adjacent conduit sections can be arranged to define the plurality of angular positions for setting or holding the two conduit sections 210 relative to each other.

For example, according to an exemplary embodiment, the magnetic members 212 on one of the conduit sections 210 can be arranged to have an opposite polarity to the magnetic members on the adjacent conduit section 210, such that the two conduit sections can be magnetically coupled or biased toward each other by an attractive magnetic force when the magnetic members on the two conduit sections are facing each other at the magnetic joint interface. According to another exemplary embodiment, the magnetic members 212 can be arranged to have the same polarity when facing each other, such that the magnetic members 212 repel each other or bias away from each other when rotated directly above an opposite magnet on the adjacent conduit section, but can attract each other or bias toward each other when rotated to the spaces between the magnetic members 212 on the end surfaces (e.g., due to the opposite polarity in those regions of the magnetic joint interface). According to various exemplary embodiments, the conduit sections 210 do not contact each other at the magnetic interface of the two conduit sections, so as to minimize the amount of friction at the joint interface. In this way, rotation of the two conduit sections relative to each other provides a particular tactile response and requires minimal effort by a user and/or by an actuator (e.g., an electromagnetic actuator, etc.).

Figure 9:
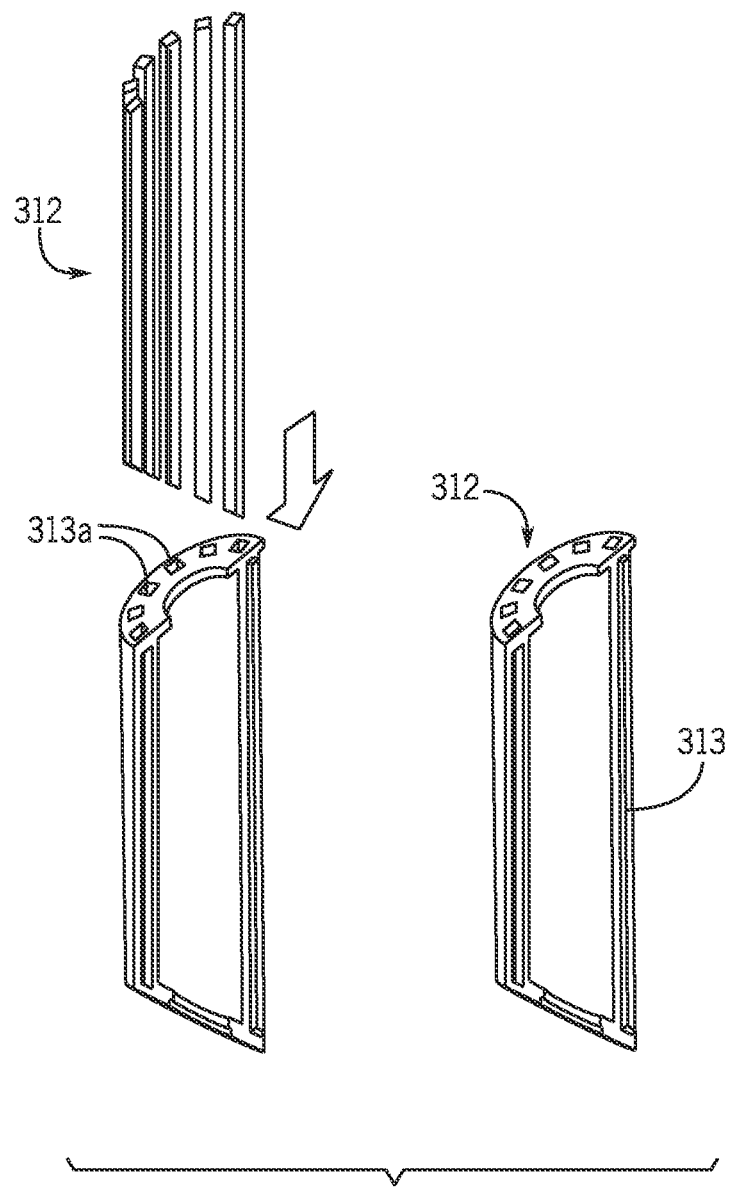
FIG. 9 illustrates a method of inserting magnetic members into a conduit section according to an exemplary embodiment.

Referring to FIG. 9, a body half 313 for a conduit section is shown including a plurality of sleeves 313a for receiving a plurality of magnetic members 312. The body half 313 and the magnetic members 312 are identical to the body half 213b and the magnetic members 212 of FIGS. 6-8C. The plurality of magnetic members 312 can each be arranged to have their north polarity facing upward and their south polarity facing downward prior to being inserted into each of the sleeves 313a of the body half 313. Each of the magnetic members 312 can have their end surfaces compound angle cut to match the angles of the corresponding end surfaces of the body half 313, such that the ends of the magnetic members 312 are substantially flush with the end surfaces of the body half 313. This can, advantageously, allow for more consistent rotation and magnetic holding of the conduit section relative to adjacent conduit sections. According to other exemplary embodiments, the pre-cut magnetic members 312 can be insert molded with the body half 313.

According to another exemplary embodiment shown in FIGS. 10A-10C, a plurality of uncut magnetic members 412 are first inserted into each of the sleeves 313a of the body half 313. The plurality of magnetic members 412 can then have their end surfaces compound angle cut to match the angles of the corresponding end surfaces of the body half 313 after the magnetic members are inserted in the body half 313, such that the ends of the magnetic members 412 are substantially flush with the end surfaces of the body half 313. According to other exemplary embodiments, the uncut magnetic members 412 can be insert molded with the body half 313, and then cut after molding and curing of the body half 313.

Referring to FIGS. 11-15, a magnetic joint 500 is shown according to an exemplary embodiment. The magnetic joint 500 can be used as a joint interface for rotatably coupling a plurality of adjacent conduit sections of a water delivery device, such as, for example, first conduit section 110 and third conduit section 130. According to other exemplary embodiments, the magnetic joint 500 can be used in other types of fluid conduits, plumbing assemblies, or other types of devices where it is desirable to rotatably couple one or more members together to, for example, allow for the selective repositioning of the members relative to each other.

As shown in the embodiment of FIGS. 11-15, the magnetic joint 500 includes a first member 520 and a second member 530. According to an exemplary embodiment, the first member 520 can be coupled to, or integrally formed with, an end of a first conduit section (e.g., conduit section 12, 110, 130, etc.). Similarly, the second member 530 can be coupled to, or integrally formed with, an end of a second, adjacent conduit section. For example, the first member 520 includes a plurality of tabs 522, 523 for coupling (e.g., inserting, etc.) the first member 520 to another member, such as a portion of a first conduit section (e.g., conduit section 12, 110, 130, etc.). Similarly, the second member 530 includes one or more tabs 531 for coupling the second member 530 to another adjacent member, such as a portion of a second conduit section. The first member 520 includes a central passage 524 defined by a protrusion 521 extending from the first member 520. The central passage 524 can, for example, permit a flow of fluid to pass between two adjacent conduit sections. The protrusion 521 has a substantially cylindrical shape, and is configured to rotatably couple the first member 520 to the second member 530. The protrusion 521 includes a flange portion 525 for retaining the second member 530 to the first member 520 in an axial direction. According to an exemplary embodiment, the first member 520 and the second member 530 only contact each other at the protrusion 521, but are otherwise spaced apart (e.g., offset, etc.) from each other (see, for example, FIG. 14).

Still referring to FIGS. 11-15, the first member 520 and the second member 530 are each configured to be selectively rotated relative to each other between a plurality of angular or rotational positions that are set by a plurality of magnetic members 510. The magnetic members 510 have a circular arrangement on each of the first member 520 and the second member 530. According to the exemplary embodiment shown, the magnetic members 510 are spaced equidistant to each other, and eight magnetic members are disposed on each of the first and second members 520, 530. According to other exemplary embodiments, there are a different number of magnetic members 510 on the first member 520 and/or the second member 530 (see, for example, FIG. 16). According to various exemplary embodiments, the spacing and the polarity of the magnetic members 510 on the first and second members 520, 530 can be arranged to define a plurality of angular positions for setting or holding the two members relative to each other.

For example, according to an exemplary embodiment, the magnetic members 510 on the first member 520 can be arranged to have an opposite polarity to the magnetic members on the second member 530, such that the two members can be magnetically coupled or biased toward each other by an attractive magnetic force when the magnetic members on the two members are facing or substantially overlapping each other. According to another exemplary embodiment shown in FIG. 11, the magnetic members 510 can be arranged to have the same polarity when facing each other, such that the magnetic members 510 repel each other or bias away from each other when rotated directly above or substantially overlapping an opposite magnet on the other member, but can attract each other or bias toward each other when rotated to the spaces between the magnetic members on the two members (e.g., due to the opposite polarity in those regions of the magnetic joint). According to an exemplary embodiment, the first member 520 only contacts the second member 530 at the protrusion 531. In other words, the two members do not contact each other at the magnetic members 510, so as to minimize the amount of friction at the joint interface. In this way, rotation of the two members relative to each other provides a particular tactile response and requires minimal effort by a user and/or by an actuator (e.g., an electromagnetic actuator, etc.).

According to another exemplary embodiment shown in FIG. 16, a faucet 600 is shown coupled to a surface 700 and includes a plurality of conduit sections coupled together by a plurality of magnetic joints 610, 620, 630, and 640, each including a different number of magnetic members. As shown, magnetic joints that are located farthest from the distal end of the spout (i.e., farthest away from the free end of the spout where fluid is discharged) and closer to the base of the faucet near surface 700 include more magnetic members as compared to magnetic joints that are located closer to the distal or free end of the spout. In other words, the faucet 600 includes a progressive number of magnetic members in the magnetic joints of the faucet.

Applicant found that the magnetic biasing force required to maintain a relative rotational position of the conduit sections varies along the length of the faucet, because of the increased load experienced by joints located closer to the base or mounting surface of the faucet. In this way, the assembly can be simplified and costs can be reduced due to a few number of magnetic members required for a particular application. For example, a first magnetic joint with a first number of magnetic members provides greater magnetic biasing forces than a second magnetic joint with a second number of magnetic members less than the first number, where the first magnetic joint is located closer to the base of the faucet than the second magnetic joint. That is to say, the magnetic biasing forces at the joints decreases with each subsequent joint starting from the base of the faucet (i.e., nearest the mounting surface) and ending at the distal end of the faucet (i.e., the portion of the spout for discharging a fluid). It should be appreciated that this progressive arrangement of magnetic members can be applied to any of the magnetic joints or water delivery devices/faucets disclosed herein (e.g., water delivery device 10, etc.).

As shown in FIG. 16, a first magnetic joint 610 located nearest the base of the faucet at the surface 700 (e.g., a first portion of the faucet) includes, for example, a lower portion (e.g., first member, etc.) including twelve magnetic members 611 and an upper portion (e.g., second member, etc.) including six magnetic members 612. A second magnetic joint 620 located closer to the distal end of the spout (e.g., a second portion of the faucet) can include less magnetic members than the first magnetic joint, because of the reduced magnetic biasing force required for the joint 620 at this position. For example, as shown, the second magnetic joint 620 includes a lower portion (e.g., third member, etc.) with twelve magnetic members 621 and an upper portion (e.g., fourth member, etc.) with only four magnetic members 622. Similarly, a third magnetic joint 630 includes a lower portion with twelve magnetic members 631 and an upper portion with only three magnetic members 632, and a fourth magnetic joint 640 located nearest the distal end of the spout includes a lower portion with twelve magnetic members 641 and an upper portion with only two magnetic members 642. By maintaining an equal number of magnetic members on the lower portion of each joint, the same number and spacing of rotational positions can be maintained for each conduit section, despite the progressive reduction in magnetic members on the upper portion of each joint. According to the exemplary embodiment shown, each of the magnetic members are equally distributed or spaced apart on each of the magnetic joints to avoid imbalances during, for example, rotation of the various conduit sections.

The water delivery devices disclosed herein include conduit sections that can be selectively rotated relative to each other between a plurality of angular or rotational positions defined by magnetic joints, so as to selectively reorient the conduit section(s) and change the overall shape of the water delivery device. This can, advantageously, allow for increased functionality of the water delivery device to, for example, fill various containers, provide access for cleaning various kitchen accessories (e.g., pots, pans, etc.), provide clearance around other structures or appliances where the water delivery device is installed, or change the overall aesthetic appearance of the water delivery device.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein.

What is claimed is:

1. A faucet comprising:
    a base configured to be coupled to a mounting surface; and
    a spout rotatably coupled to the base, the spout comprising:
    a plurality of conduit sections rotatably coupled to each other, wherein an end of each conduit section of the plurality of conduit sections includes a plurality of magnetic members arranged with alternating polarities,
    wherein magnetic members on an end of a first conduit section are attracted to magnetic members having opposite polarity on a second, adjacent conduit section to thereby set a relative rotational position of the adjacent conduit sections, and wherein the first plurality of magnetic members on the first conduit section repel magnetic members having a same polarity on the second, adjacent conduit section to thereby set a different relative rotational position of the adjacent conduit sections.

2. The faucet of claim 1, wherein the spout comprises a plurality of magnetic joints, each of the plurality of magnetic joints comprises:
    a first member configured to be coupled to an end of a conduit; and
    a second member rotatably coupled to the first member and configured to be coupled to an end of an adjacent conduit;
        wherein the first member includes a first plurality of magnetic members spaced apart from each other and arranged annularly on the first member; and
        wherein the second member includes a second plurality of magnetic members spaced apart from each other and arranged annularly on the second member, wherein each of the first and second plurality of magnetic members is arranged with alternating polarities.

3. The faucet of claim 2, wherein the first plurality of magnetic members are spaced equidistant relative to each other, and wherein the second plurality of magnetic members are spaced equidistant relative to each other.

4. The faucet of claim 2, wherein the first member is configured to bias away from the second member when the first plurality of magnetic members substantially overlap the second plurality of magnetic members.

5. The faucet of claim 4, wherein the first member is configured to bias toward the second member when the first plurality of magnetic members substantially overlap the spaces between the second plurality of magnetic members.

6. The faucet of claim 1, wherein each of the conduits is substantially rigid.

7. The faucet of claim 1, wherein each of the conduits has an angled interface between adjacent conduit.

8. The faucet of claim 1, wherein one or more of the conduits includes an elbow portion.

9. The faucet of claim 1, further comprising a fluid conduit extending through one or more of the plurality of conduits, wherein the fluid conduit is configured to direct fluid from a fluid supply source to the free end of the spout.

10. A faucet comprising:
a spout comprising:
a plurality of magnetic joints each including a number of magnets; and
a plurality of conduits rotatably coupled to each other by a magnetic joint of the plurality of magnetic joints;
wherein the spout extends from a first end configured to be coupled to a base to a second end configured to discharge a fluid; and
wherein the plurality of magnetic joints are arranged such that the magnetic members on each magnetic joint, wherein the magnets on adjacent conduit sections forming each magnetic joint do not contact each other thereby minimizing friction at each magnetic joint.

11. The faucet of claim 10, wherein each of the plurality of magnetic joints comprises:
a first member configured to be coupled to an end of a conduit; and a second member rotatably coupled to the first member and configured to be coupled to an end of an adjacent conduit;
wherein the first member includes a first plurality of magnets spaced apart from each other and arranged annularly on the first member with alternating polarities; and
wherein the second member includes a second plurality of magnets spaced apart from each other and arranged annularly on the second member with alternating polarities, wherein there is no contact between the first plurality of magnets and the second plurality of magnets.

12. The faucet of claim 11, wherein the first plurality of magnets are spaced equidistant relative to each other, and wherein the second plurality of magnets are spaced equidistant relative to each other.

13. The faucet of claim 11, wherein the first member is configured to bias away from the second member when the first plurality of magnets substantially overlap the second plurality of magnets.

14. The faucet of claim 13, wherein the first member is configured to bias toward the second member when the first plurality of magnets substantially overlap the spaces between the second plurality of magnets.

15. The faucet of claim 10, wherein each of the conduits has an angled interface between adjacent conduits.

16. The faucet of claim 10, wherein one or more of the conduits includes an elbow portion.

17. The faucet of claim 10, further comprising a fluid conduit extending through one or more of the plurality of conduits, wherein the fluid conduit is configured to direct fluid from a fluid supply source to the second end of the spout.

18. A faucet comprising:
a base configured to be coupled to a mounting surface; and
a spout rotatably coupled to the base, the spout comprising:
a first conduit rotatably coupled to the base by a first magnetic joint wherein the first conduit is configured to be rotated relative to the base between a plurality of rotational positions defined by the first magnetic joint; and
wherein the first magnetic joint comprises:
a first member coupled to an end of the base; and
a second member rotatably coupled to the first member and to an end of the first conduit,
wherein each of the first and second members comprises a plurality of magnets arranged with alternating polarities;
wherein the first member includes a first plurality of magnets spaced apart from each other and arranged annularly on the first member;
wherein the second member includes a second plurality of magnets spaced apart from each other and arranged annularly on the second member; and
a second conduit rotatably coupled to the first conduit by a second magnetic joint, the second conduit defining a free end of the spout, wherein the second magnetic joint comprises:
a third member coupled to an end of the first conduit; and
a fourth member rotatably coupled to the third member and coupled to an end of the second conduit;
wherein the third member includes a third plurality of magnets spaced apart from each other and arranged annularly on the third member;
wherein the fourth member includes a fourth plurality of magnets spaced apart from each other and arranged annularly on the fourth member;
wherein the fourth plurality of magnets is less than the third plurality of magnets; and
wherein the third plurality of magnets is equal to the first plurality of magnets.

* * * * *